United States Patent
Sahin et al.

(10) Patent No.: US 11,194,031 B2
(45) Date of Patent: Dec. 7, 2021

(54) APPARATUS AND TECHNIQUES FOR 3D RECONSTRUCTION WITH COORDINATED BEAM SCAN USING MILLIMETER WAVE RADAR

(71) Applicant: QUALCOMM Incorporated, San Diego, CA (US)

(72) Inventors: Mustafa Emin Sahin, Winnetka, CA (US); Roberto Rimini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 16/201,851

(22) Filed: Nov. 27, 2018

(65) Prior Publication Data

US 2020/0166623 A1 May 28, 2020

(51) Int. Cl.
*G01S 13/04* (2006.01)
*H01Q 3/28* (2006.01)
*H01Q 3/34* (2006.01)
*G01S 13/90* (2006.01)

(52) U.S. Cl.
CPC .............. *G01S 13/04* (2013.01); *G01S 13/90* (2013.01); *H01Q 3/28* (2013.01); *H01Q 3/34* (2013.01)

(58) Field of Classification Search
CPC ........ G01S 13/003; G01S 13/04; G01S 13/90; G01S 2013/0245; G01S 7/006; H01Q 3/28; H01Q 3/34
See application file for complete search history.

(56) References Cited

U.S. PATENT DOCUMENTS

| | | | | |
|---|---|---|---|---|
| 7,119,734 | B2 * | 10/2006 | Nakano | G01S 7/412 342/70 |
| 10,663,573 | B2 * | 5/2020 | Honma | G01S 13/003 |
| 2005/0225481 | A1 * | 10/2005 | Bonthron | H01Q 1/3233 342/175 |
| 2009/0129652 | A1 * | 5/2009 | Zwirn | A61B 5/0507 382/131 |
| 2014/0269389 | A1 * | 9/2014 | Bukkfejes | G01S 3/48 370/252 |
| 2015/0382398 | A1 * | 12/2015 | Guo | H04W 76/28 370/328 |
| 2016/0178745 | A1 * | 6/2016 | Mohamadi | G01S 13/0209 342/21 |

(Continued)

*Primary Examiner* — Timothy A Brainard
(74) *Attorney, Agent, or Firm* — Thien T. Nguyen

(57) ABSTRACT

Certain embodiments are directed to techniques (e.g., a device, a method, a memory or non-transitory computer readable medium storing code or instructions executable by one or more processors) for object detection and three-dimensional reconstruction of objects using coordinated beam scanning. The disclosed techniques teach coordinated beam scanning that can be used for both detecting proximity to personnel in addition to detecting objects for three-dimensional object reconstructions. The techniques form one or more millimeter wave beam that can be electronically steered by adjusting the phase of the various antenna elements. The techniques can include saving the plurality of grid points for which the object is detected to a memory for detecting a range to the object for Maximum Permitted Exposure (MPE) limit monitoring and three-dimensional object reconstruction.

30 Claims, 14 Drawing Sheets

(56) References Cited

U.S. PATENT DOCUMENTS

| | | | | |
|---|---|---|---|---|
| 2016/0334504 A1* | 11/2016 | Ling | .................. | G01S 13/931 |
| 2017/0029107 A1* | 2/2017 | Emami | .................. | G01S 13/42 |
| 2018/0132114 A1* | 5/2018 | Sun | .................. | H04B 7/0695 |
| 2018/0259641 A1* | 9/2018 | Vacanti | .................. | G01S 13/4472 |
| 2018/0278318 A1* | 9/2018 | Chakraborty | .................. | H04B 7/0404 |
| 2018/0341000 A1* | 11/2018 | Cohen | .................. | G01S 7/003 |
| 2019/0058264 A1* | 2/2019 | Jung | .................. | H01Q 1/243 |

* cited by examiner

APPARATUS AND TECHNIQUES FOR 3D RECONSTRUCTION WITH COORDINATED BEAM SCAN USING MILLIMETER WAVE RADAR

FIELD

The present disclosure relates generally to wireless communication and, more specifically to using multiple antenna array elements to scan an environment that includes three-dimensional objects.

BACKGROUND

Cellular and other wireless networks can utilize high frequencies and small wavelengths to provide high data rates. In particular, "fifth generation" (5G) capable devices communicate using frequencies at or near the extremely-high frequency (EHF) spectrum with wavelengths at or near millimeter wavelengths. Although higher frequency signals provide larger bandwidths to efficiently communicate large amounts of data, these signals suffer from higher path loss (e.g., path attenuation). To compensate for the higher path loss, transmit power levels can be increased or beamforming can concentrate energy in a particular direction.

Accordingly, the Federal Communications Commission (FCC) has determined a maximum permitted exposure (MPE) limit. To meet targeted guidelines, devices are responsible for balancing performance with transmission power and other constraints. Various schemes have been devised to detect objects and personnel in proximity to electronic devices and reduce transmission power settings to comply with MPE limits."

BRIEF SUMMARY

Certain embodiments are directed to techniques (e.g., a device, a method, a memory or non-transitory computer readable medium storing code or instructions executable by one or more processors) for object detection and three-dimensional reconstruction of objects using coordinated beam scanning.

In some embodiments, the techniques disclose a method of coordinated beam scanning that can be used for both detecting proximity to personnel in addition to detecting objects for three-dimensional object reconstructions. The techniques can utilize the same antenna used for data upload and download from the computing device.

In various embodiments, the techniques can include forming a first millimeter wave beam having a first shape and positioned in space, by transmitting signals from a first antenna array comprising a plurality of antenna elements. The techniques can include forming a second millimeter wave beam having a second shape and positioned in space, by receiving signals from a second antenna array comprising a second plurality of antenna elements, where the first shape of the first millimeter wave beam intersects the second shape of the second millimeter wave beam at a target location in space. In response to detection of reflected signals based on reception associated with the second millimeter wave beam, the techniques can include detecting an object at the target location. The techniques can include repeating the steps of forming the first millimeter wave beam, forming the second millimeter wave beam, and attempting to detect the object at each of a plurality of grid points in three-dimensional space.

The techniques can include saving results relating to the attempting detection at the plurality of grid points to a memory.

In various embodiments, the results relating to the attempted detection include the plurality of grid points for detections of the object.

In various embodiments, the steps of forming the first millimeter wave beam, forming the second millimeter wave beam, and attempting to detecting the object at each of a plurality of grid points in three-dimensional space are performed during unused transmission opportunities. The unused transmission period can comprise an unused random-access channel period.

In various embodiments, the forming the first millimeter wave can be accomplished by adjusting a transmission power level and a phase difference of the first antenna array. In various embodiments the forming the second millimeter wave can be accomplished by adjusting a gain level of the receiving beam and a phase difference of the second antenna array.

In various embodiments, the techniques can also include generating an image of the object using results relating to the attempted detection include the plurality of grid points for detections of the object. The techniques can also include saving the plurality of grid points for misses for the detection of the object to the memory. The techniques can also include an image of the object using the plurality of grip points for misses for the detection of the object saved in the memory. The techniques can also include generating an image of the object using the plurality of grip points for which an object is detected and the plurality of grid points for which misses for the detection of the object saved in the memory.

In various embodiments, the first antenna array can include a four by four antenna element matrix. The second antenna array can also include a four by four antenna element matrix. In various embodiments, the first antenna array can be located in a first corner of a first side of a portable electronic device. The second antenna array can also be located in a second corner of the first side of the portable electronic device, where the second corner is opposing the first corner.

In various embodiments, the first antenna array and the second antenna array can perform transmission and reception for data communication. The transmission and reception of cellular data be performed on a fifth generation (5G) cellular network.

In various embodiments, the object detected can be at least a part of a human body, and the plurality of grid points for which the objected is detected are used for calculating a distance for comparison to a maximum permissible exposure level.

In various embodiments, the millimeter wave beam can be formed by orthogonal frequency-division multiplexing. The millimeter wave beam can also be formed by continuous wave transmission. The millimeter wave beam can also be formed by frequency modulated continuous wave transmission. The millimeter wave beam can be formed by direct sequence spread spectrum transmission.

In various embodiments, the techniques can also include detecting false detections. In various embodiments, the techniques for detecting false detections can include calculating an elevation angle and an azimuth angle for the first millimeter wave beam and the second millimeter wave beam, where the elevation angle and azimuth angle for the first millimeter wave beam and the second millimeter wave beam can determine a range to the target point. The technique can include calculating a time delay between transmission of the first millimeter wave beam and reception of the second millimeter wave beam to calculate a distance. The technique can include comparing the calculated distance with the determined range to identify one or more false detections of the object. The technique can include removing false detections if the calculated distance differs by a threshold amount from the determined range.

These and other embodiments are described in detail below. For example, other embodiments are directed to systems, devices, and computer readable media associated with methods described herein.

A better understanding of the nature and advantages of embodiments of the present disclosed may be gained with reference to the following detailed description and the accompanying drawings.

DETAILED DESCRIPTION

Certain embodiments of the present disclosure relate to devices, computer-readable medium, and methods for object detection and three-dimensional reconstruction of objects using coordinated beam scanning.

An electronic device can use a high transmit power to compensate for path loss associated with millimeter wave (mmW) signals. Many of these electronic devices can be physically operated by a user. Such physical proximity presents opportunities for radiation to exceed given guidelines, such as a maximum permitted exposure (MPE) limit as determined by the Federal Communications Commission (FCC). Because of these issues, it is advantageous to enable devices to detect a proximity of the user. The disclosed techniques allow for the detection of human skin within 10 meters of the computing device.

In various embodiments, the one or more antenna arrays used for data transfer can be used to for proximity detection based on coordinated beam scanning techniques described herein. Using coordinated beam scanning, the transmission and reception beams can be simultaneously directed to the same location in three-dimensional space by application of weights (i.e., suitable phase difference between the antenna elements and suitable transmission and reception power settings). An object in the vicinity of the electronic device can be located if a transmission beam from a first antenna array is reflected off the object and the reflected beam is received by the second antenna array. If an object is located, the a range (e.g., distance or slant range) from the electronic device can be calculated for MPE limits. Responsive to proximity detection, transmission parameters can be adjusted for wireless communication to enable the wireless transceiver to meet safety guidelines promulgated by the government or the wireless industry, such as a Maximum Permitted Exposure (MPE) limit as determined by the Federal Communications Commission (FCC). The described techniques for proximity detection offer a relatively inexpensive approach that can utilize existing transceiver hardware without introducing additional sensors.

In some embodiments, the techniques can be used for three-dimensional reconstruction of objects in the vicinity of the electronic device. If an object is detected, the location coordinates can be saved in a memory of the electronic device. In various embodiments of the technique, steps of forming the first millimeter wave, forming the second millimeter wave, and detecting the object are repeated for at each of a plurality of grid points in three-dimensional space. In some embodiments, the coordinates for detected objects are saved in a memory. In some embodiments, the coordinates for detected objects and misses are saved in the memory. In some embodiments, the coordinates for misses are saved in the memory. In various embodiments the saved coordinates can be used to generate a three-dimensional image of the object.

Figure 1:
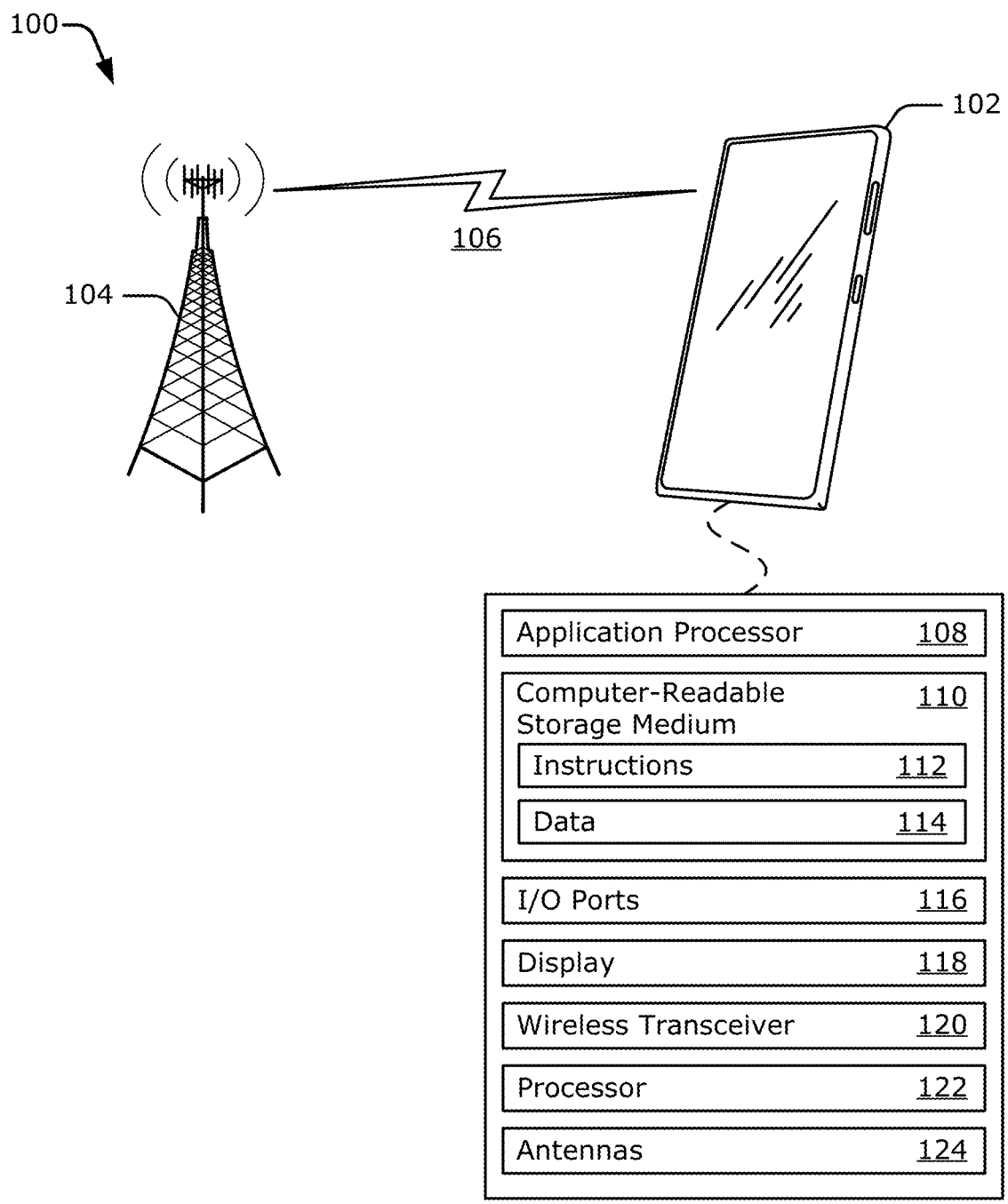
FIG. 1 illustrates an example computing device for object detection and three-dimensional reconstruction of objects using coordinated beam scanning.

FIG. 1 illustrates an example computing device 102 for object detection and three-dimensional reconstruction of objects using coordinated beam scanning. In an example environment 100, the computing device 102 communicates with a base station 104 through a wireless communication link 106 (wireless link 106). In this example, the computing device 102 is implemented as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, server, network-attached storage (NAS) device, smart appliance or other internet of things (IoT) device, medical device, vehicle-based communication system, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, cable television head-end, terrestrial television broadcast tower, access point, peer-to-peer device, mesh network node, small cell node, fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102 and an uplink of other data or control information communicated from the computing device 102 to the base station 104. The wireless link 106 may be implemented using any suitable communication protocol or standard, such as 3rd Generation Partnership Project Long-Term Evolution (3GPP LTE), 5th Generation (5G), IEEE 802.11, IEEE 802.16, Bluetooth™, and so forth. In some implementations, instead of or in addition to providing a data link, the wireless link 106 may wirelessly provide power and the base station 104 may comprise a power source.

The computing device 102 includes an application processor 108 and a computer readable storage medium 110 (CRM 110). The application processor 108 may include any type of processor (e.g., an application processor, a digital signal processor (DSP), or a multi-core processor), that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A wireless transceiver 120 of the computing device 102 provides connectivity to respective networks and other electronic devices connected therewith. Additionally, the computing device 102 may include a wired transceiver, such as an Ethernet or fiber optic interface for communicating over a local network, intranet, or the Internet. The wireless transceiver 120 may facilitate communication over any suitable type of wireless network, such as a wireless LAN (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith.

The wireless transceiver 120 includes circuitry and logic for transmitting and receiving signals via antennas 124. Components of the wireless transceiver 120 can include amplifiers, mixers, switches, analog-to-digital converters, filters, and so forth for conditioning signals. The wireless transceiver 120 may also include logic to perform in-phase/ quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains).

The computing device 102 also includes a processor 122, which is coupled to the wireless transceiver 120. The processor 122 can be implemented within or separate from the wireless transceiver 120. Although not explicitly shown, the processor 122 can include a portion of the CRM 110 or can access the CRM 110 to obtain computer-readable instructions. The processor 122, which can be implemented as a modem, controls the wireless transceiver 120 and enables wireless communication or proximity detection to be performed. The processor 122 can include baseband circuitry to perform high rate sampling processes that can include analog-to-digital conversion, digital-to-analog conversion, Fourier transforms, gain correction, skew correction, frequency translation, and so forth. The processor 122 can provide communication data to the wireless transceiver 120 for transmission. The processor 122 can also process a baseband version of a signal obtained from the wireless transceiver 120 to generate data, which can be provided to other parts of the computing device 102 via a communication interface for wireless communication or proximity detection.

Figure 2:
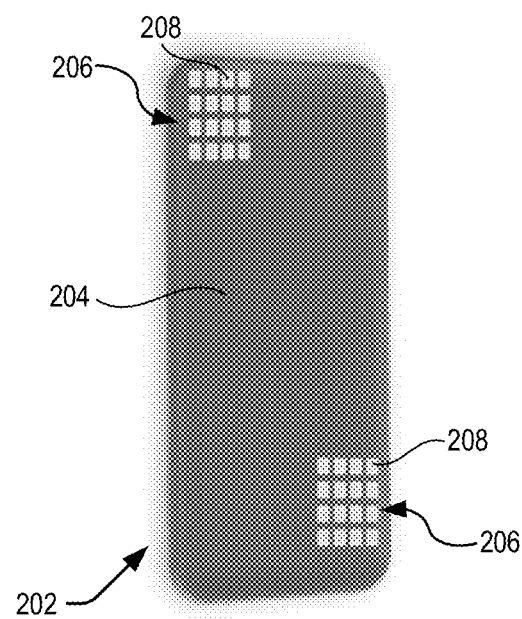
FIG. 2 illustrates an example computing device for object detection and three-dimensional reconstruction of objects using coordinated beam scanning depicting a multiple antenna arrays affixed to one side of the device.

FIG. 2 illustrates an example computing device for object detection and three-dimensional reconstruction of objects using coordinated beam scanning depicting a plurality of antenna arrays. FIG. 2 depicts a view of an computing device 202, similar to the computing device 102 described for FIG. 1. In accordance with various embodiments, the computing device 202 can have a first side, not shown, and a second side 204. The first side of the computing device 202 can have a display. The second side 204, opposite the first side, can include an antenna array 206. The antenna array 206 can comprise a planar array with multiple antenna array elements 208. While the antenna array 206 illustrated in FIG. 2 comprises an antenna array 206 comprising a four by four (4×4) antenna array, the techniques are not limited to the number of antenna array elements in the antenna array 206. For example, a five by five or three by three antenna array can also be used.

FIG. 2 illustrates an antenna array 206 disposed in opposing corners of a second side of the computing device 202. While the antenna arrays 206 are depicted as being disposed in an upper left corner and a lower right corner of the second side of the computing device 202, the techniques are not so limited. Alternatively, the antenna arrays 206 can be located in various positions on the second side of the computing device 202. However, having a first antenna array offset both vertically and horizontally from the second antenna array on the second side of the computing device 202 is advantageous.

The antenna array elements 208 can comprise a patch antenna. A patch antenna is a type of radio antenna with a low profile, which can be mounted on a flat surface. It consists of a flat rectangular sheet or "patch" of metal, mounted over a larger sheet of metal called a ground plane. The two metal sheets together can form a resonant piece of microstrip transmission line with a length of approximately one-half wavelength of the radio waves. The radiation mechanism arises from discontinuities at each truncated edge of the microstrip transmission line. The radiation at the edges can cause the antenna to act slightly larger electrically than its physical dimensions, so in order for the antenna to be resonant, a length of microstrip transmission line slightly shorter than one-half the wavelength at the frequency can be used. The patch antenna is mainly practical at microwave frequencies, at which wavelengths are short enough that the patches are conveniently small. The patch antenna can be widely used in portable wireless devices because of the ease of fabricating it on printed circuit boards. Multiple patch antennas on the same substrate (see image) called microstrip antennas, can be used to make high gain array antennas, and phased arrays in which the beam can be electronically steered.

Figure 3:
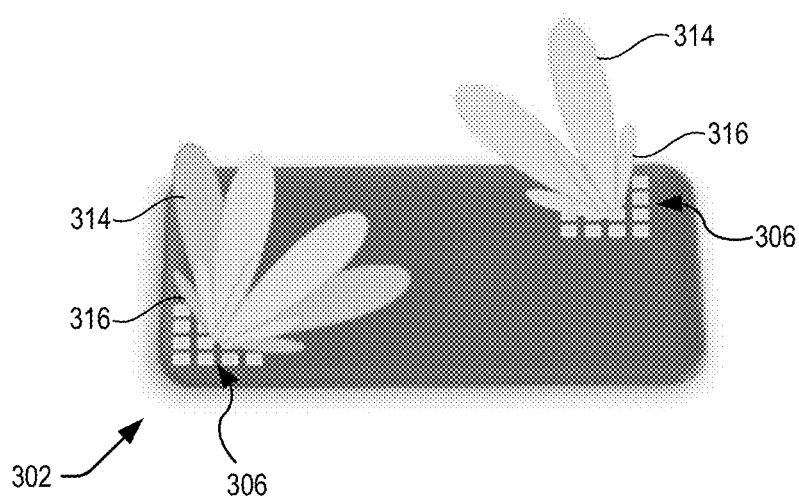
FIG. 3 illustrates an example computing device for object detection and three-dimensional reconstruction of objects using coordinated beam scanning illustrating a transmission beam and a reception beam formed using a multiple antenna arrays affixed to one side of the device.

FIG. 3 illustrates an example computing device 302 for object detection and three-dimensional reconstruction of objects using coordinated beam scanning a transmission beam and a reception beam formed using a plurality of antenna arrays. FIG. 3 three depicts a main lobe 314 and side lobes 316 emitting from an antenna array 306. Beamforming is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity. The improvement compared with omnidirectional reception/transmission is known as the directivity of the array.

FIG. 3 depicts both main lobes 314 and side lobes 316. In an antenna's radiation pattern, the main lobe 314, or main beam, is the lobe containing the higher power. This is the lobe that exhibits the greater field strength. The radiation pattern of most antennas shows a pattern of "lobes" at various angles, directions where the radiated signal strength reaches a maximum, separated by "nulls", angles at which the radiation falls to zero. In a directional antenna in which the objective is to emit the radio waves in one direction, the lobe in that direction is designed to have higher field strength than the others, so on a graph of the radiation pattern it appears biggest; this is the main lobe. The other lobes are called side lobes 316, and usually represent unwanted radiation in undesired directions.

As the location of the transmission array and the receiving array are known, the array controller can adjust the transmission beam and receiving beam to point to the same location in space. Using coordinated beam scanning, the phase difference and power setting can be adjusted for the transmission beam to move the beam to a particular location in three-dimensional space. Also, by adjusting the phase difference and gain setting for the receiving beam, the array can receive radiation from a particular location in three-dimensional space. Coordinated beam scanning adjusts both the settings for the transmission beam and the receiving beam simultaneously to point at the same location in three-dimensional space.

Figure 4:
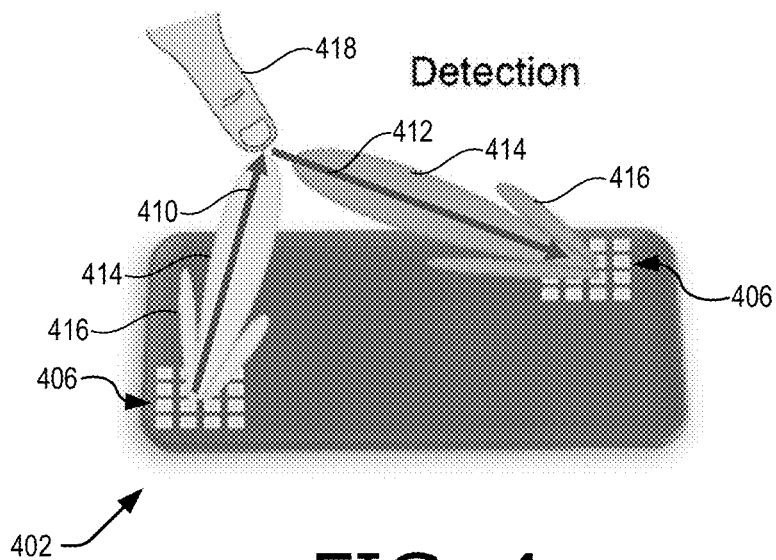
FIG. 4 illustrates an example computing device for object detection and three-dimensional reconstruction of objects using coordinated beam scanning depicting detection of an object.

FIG. 4 illustrates an example computing device for object detection and three-dimensional reconstruction of objects using coordinated beam scanning depicting detection of an object. FIG. 4 shows a computing device 402 with multiple antenna arrays 406. The antenna arrays 406 employ coordinated beam scanning to generate a transmission beam 410 having a main lobe 414 and a side lobe 416. FIG. 4 also shows a receiving beam 412 having a main lobe 414 and a side lobe 416. FIG. 4 illustrates the transmission beam 410 and the receiving beam 412 electronically steered to the same location in space. FIG. 4 illustrates an object 418 such as a finger located at the location in space. The transmission beam 410 hits the object 418 and the radar beam can be both absorbed and reflected off the object 418. The reflected energy from the transmission beam 410 is scattered in various directions depending on the physical geometries of the object 418. The receiving beam 412 can detect the energy reflecting off the object 418 and an detection can be indicated by the system. The system can record the detection using the three dimensional coordinates of the location in space that the detection occurred by using the phase, power level, and gain settings for the transmission beam 410 and receiving beam 412. The detection can be stored as a binary value (e.g., a "1") for the three dimensional location in space.

Figure 5:
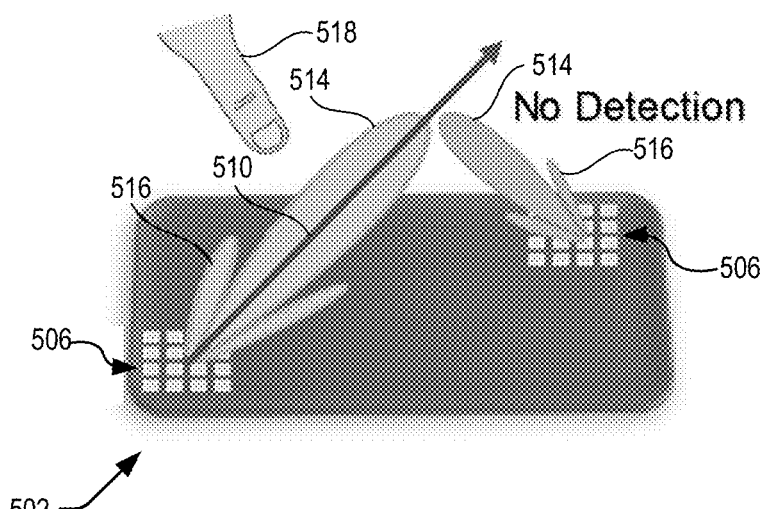
FIG. 5 illustrates an example computing device for object detection and three-dimensional reconstruction of objects using coordinated beam scanning depicting non-detection (or miss) of an object.

FIG. 5 illustrates an example computing device for object detection and three-dimensional reconstruction of objects using coordinated beam scanning depicting non-detection of an object. FIG. 5 shows a computing device 502 with multiple antenna arrays 506. The antenna arrays 506 employ coordinated beam scanning to generate a transmission beam 510 having a main lobe 514 and a side lobe 516. FIG. 5 illustrates the transmission beam 510 and the receiving beam electronically steered to the target location in space. FIG. 5 illustrates an object 518 such as a finger located at a position other than the target location in space. The transmission beam 410 fails to hit the object 518. Therefore, the transmission beam is not reflected off the object 518. The receiving beam 512 is electronically steered to the target location but does not detect energy reflecting off the object 518. Therefore, a "miss" or failed detection can be indicated by the system. The system can record the miss using the three dimensional coordinates of the location in space that the detection occurred by using the phase, power level, and gain settings for the transmission beam 510 and receiving beam 512. The miss can be stored as a binary value (e.g., a "0") for the three dimensional location in space.

Figure 6:
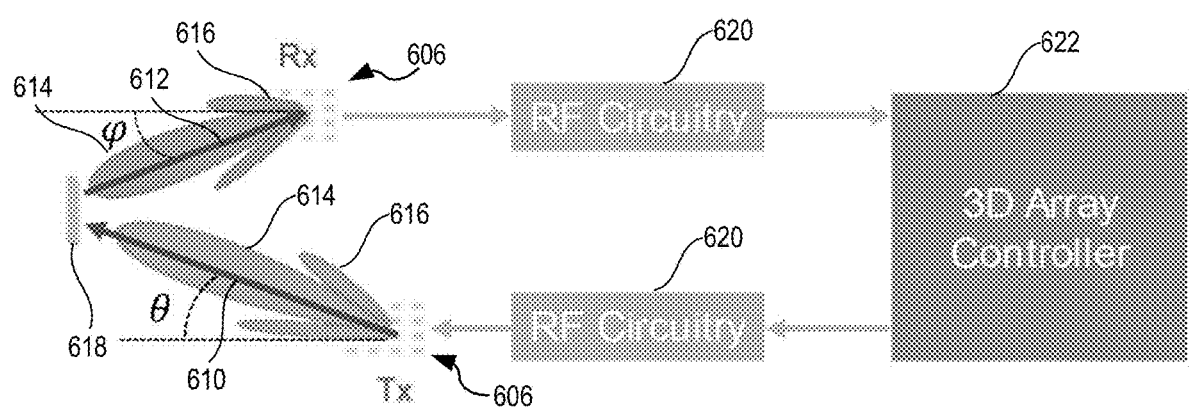
FIG. 6 illustrates a simplified block diagram of the system for coordinated beam scanning.

FIG. 6 illustrates a simplified block diagram of the system for coordinated beam scanning. FIG. 6 depicts a transmission beam 610 and a receiving beam 612 emitting from an antenna array 606 meeting at a target location at which an object 618 is located. The transmission beam 610 and receiving beam can include both a main lobe 614 and side lobes 616. Angle Theta ($\theta$) can represent the azimuth angle of the transmission beam 610 and Angle Phi ($\Phi$) can represent the azimuth angle of the receiver beam 612. The azimuth and elevation angles of the transmission beam 610 and the receiver beam 612 can be generated by adjusting the phase, power level (transmission beam) and gain level (receiving beam). The radio frequency circuitry 620 can include various components including but not limited to a transmitter, a receiver, a power supply, filters, amplifiers, differentials, and phase shifters. The radio frequency circuitry 620 can form the transmission beam 610 and the receiving beam 612 such that the beams intersect at a target location 618.

FIG. 6 also depicts a 3D array controller 622. The 3D array controller 622 can include a processor, a memory, and various circuits to provide instructions to the radio frequency circuitry 620 to can form the transmission beam 610 and the receiving beam 612. The 3D array controller 622 knows the location of the antenna arrays from the form factor the computing device. The 3D array controller 622 can determine the target location 618 where the transmission beam 610 and receiving beam 612 will intersect. As such, the 3D array controller 622 can geometrically calculate elevation and azimuth angles of the transmission beam 610 and receiver beam 612. The 3D array controller 622 can perform binary detection of the object 618 calculating a detection of the target 618 and misses and store the binary result data in the memory.

Figure 7:
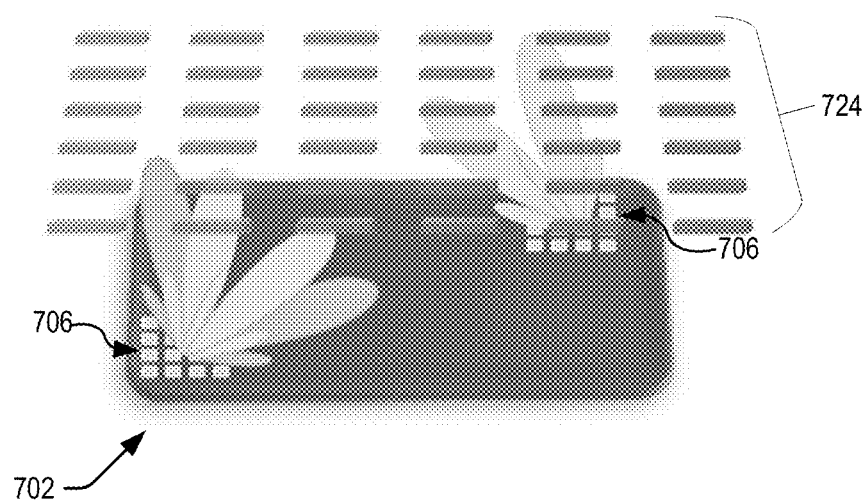
FIG. 7 illustrates an exemplary computing device for object detection and three-dimensional reconstruction of objects using coordinated beam scanning depicting scanning a series of grid locations.

FIG. 7 illustrates an exemplary computing device 702 for object detection and three-dimensional reconstruction of objects using coordinated beam scanning depicting scanning a series of grid locations. FIG. 7 illustrates multiple antenna arrays 706. The 3D array controller 622, shown in FIG. 6, can vary phase, power level, and low-noise amplifier (LNA) gain levels to effect a scan. By changing these parameters, the target locations can comprise a series of grid locations 724 in three dimensional space that can be scanned. In various embodiments, the scan can be completed in the order of microseconds.

Figure 8:
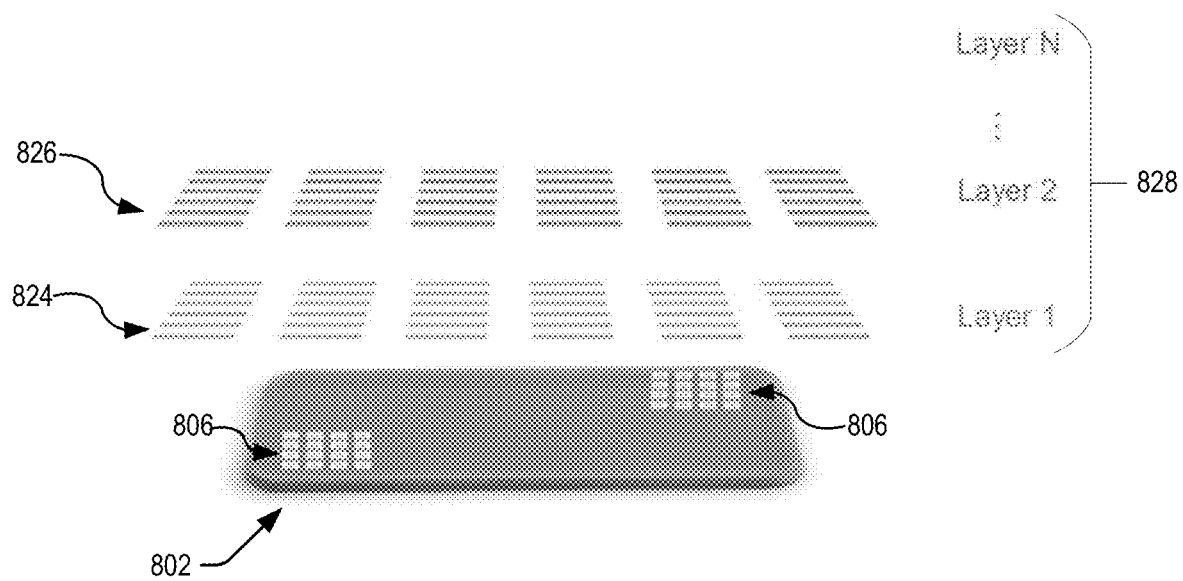
FIG. 8 illustrates an exemplary computing device for object detection and three-dimensional reconstruction of objects using coordinated beam scanning depicting scanning a series of grid locations for varying layers.

FIG. 8. illustrates an exemplary computing device 802 for object detection and three-dimensional reconstruction of objects using coordinated beam scanning depicting scanning a series of grid locations for varying layers. Each layer can represent a different range from the computing device 802. For example a first layer 824 can exist at a first range from the computing device 802. A first and second antenna arrays 806 are also shown. A second later 826 can exist at a second range from the computing device 802. FIG. 8 illustrates multiple layers 828 at various ranges that can be scanned by the array controller 622, shown in FIG. 6, adjusting the transmission power level (power amplifier gains) and receiving beam signal amplification (LNA gain levels). The array controller 622 can determine the number of layers 828 necessary for the particular task. The number of layers 828 and the distance between layers can be determined by the array controller 622 as needed to capture the details for three-dimensional reconstruction of an object. The range can be extended as far as several meters from the computing device 802 depending on the use case.

Figure 9:
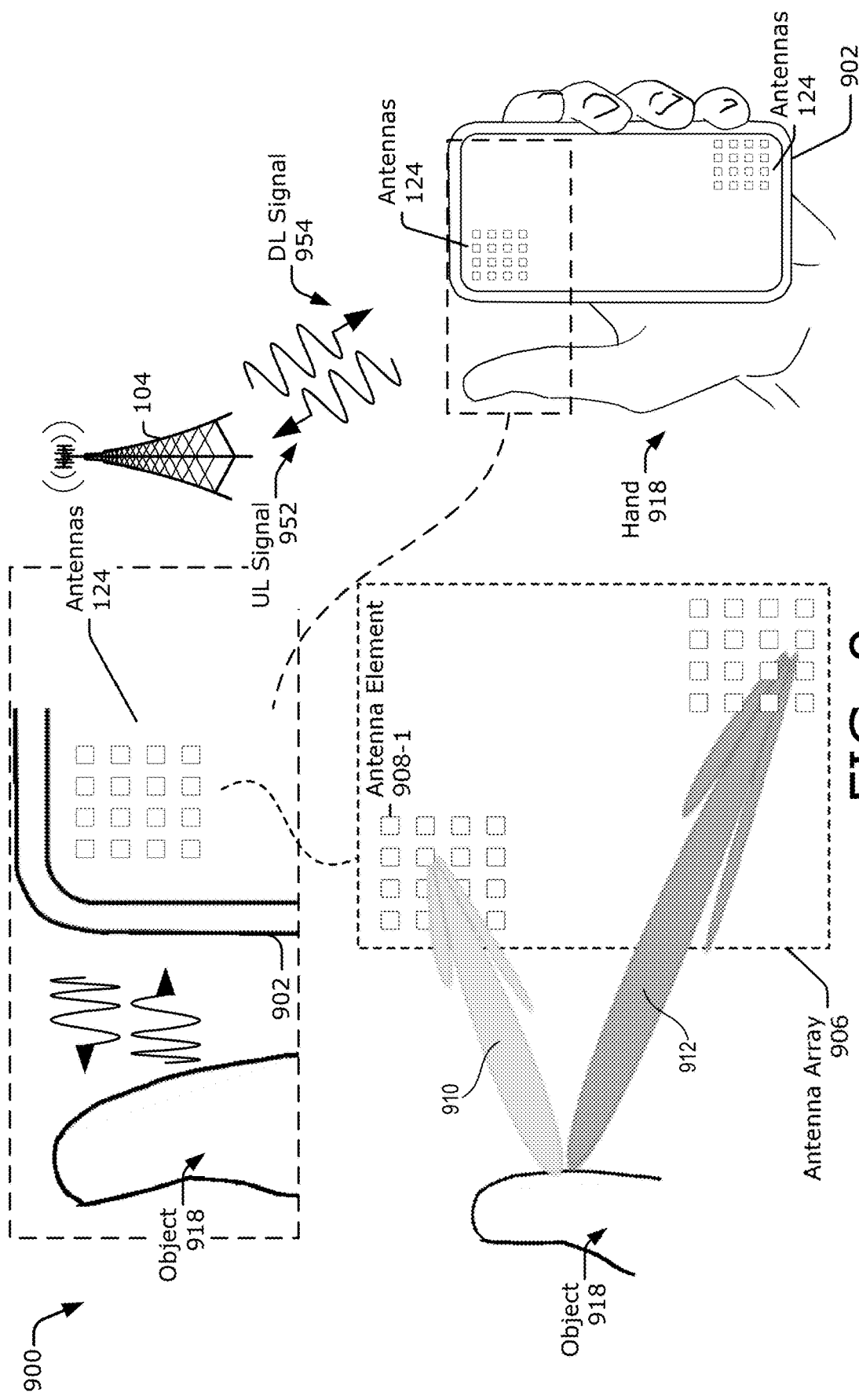
FIG. 9 illustrates an example operating environment for proximity detection based on coordinated beam scanning techniques.

FIG. 9 illustrates an example operating environment 900 for proximity detection based on coordinated beam scanning techniques. In the example environment 900, a hand 918 of a user holds the computing device 902. In one aspect, the computing device 902 communicates with the base station 104 by transmitting an uplink signal 952 (UL signal 952) or receiving a downlink signal 954 (DL signal 954) via the antennas 124. A user's thumb, however, may represent a proximate object 918 that may be exposed to radiation via the uplink signal 952.

To detect whether the object 918 exists or is within a detectable range, the computing device 102 can employ coordinated beam scanning to generate a transmission beam 910 and a receiving beam 912. The transmission beam 910 and the receiving beam 912 can be electronically steered to the same location in space. FIG. 9 illustrates an object 918 such as a thumb 918 located at the location in space. The transmission beam 910 hits the object 918 and the radar beam can be both absorbed and reflected off the object 918. The reflected energy from the transmission beam 910 is scattered in various directions depending on the physical geometries of the object 918. The receiving beam 912 can detect the this energy reflecting off the object 918 and a detection can be indicated by the system. The system can record the detection using the three dimensional coordinates of the location in space that the detection occurred by using the phase, power level, and gain settings for the transmission beam 910 and receiving beam 912. In some cases, the transmission beam 910 may be generated such that it includes a single frequency or tone or multiple frequencies or tones. For example, the transmission beam 910 can include an orthogonal frequency-division multiplexing (OFDM) signal having multiple sub-carriers of different frequencies. As another example, the transmission beam 910 can include a frequency-modulated continuous wave (FMCW) signal (e.g., a linear frequency-modulated (LFM) continuous wave signal or chirp signal, a triangular frequency-modulated continuous wave signal, a saw tooth frequency-modulated continuous wave signal, and so forth). As yet another example, the transmission beam 910 can include a continuous-wave signal having a relatively constant frequency.

In some implementations, the antennas 124 may comprise an array comprises of several antenna elements 908. The antenna array 906 can include multiple antenna elements 908-1 to 908-N, where N represents a positive integer greater than one.

Figure 10:
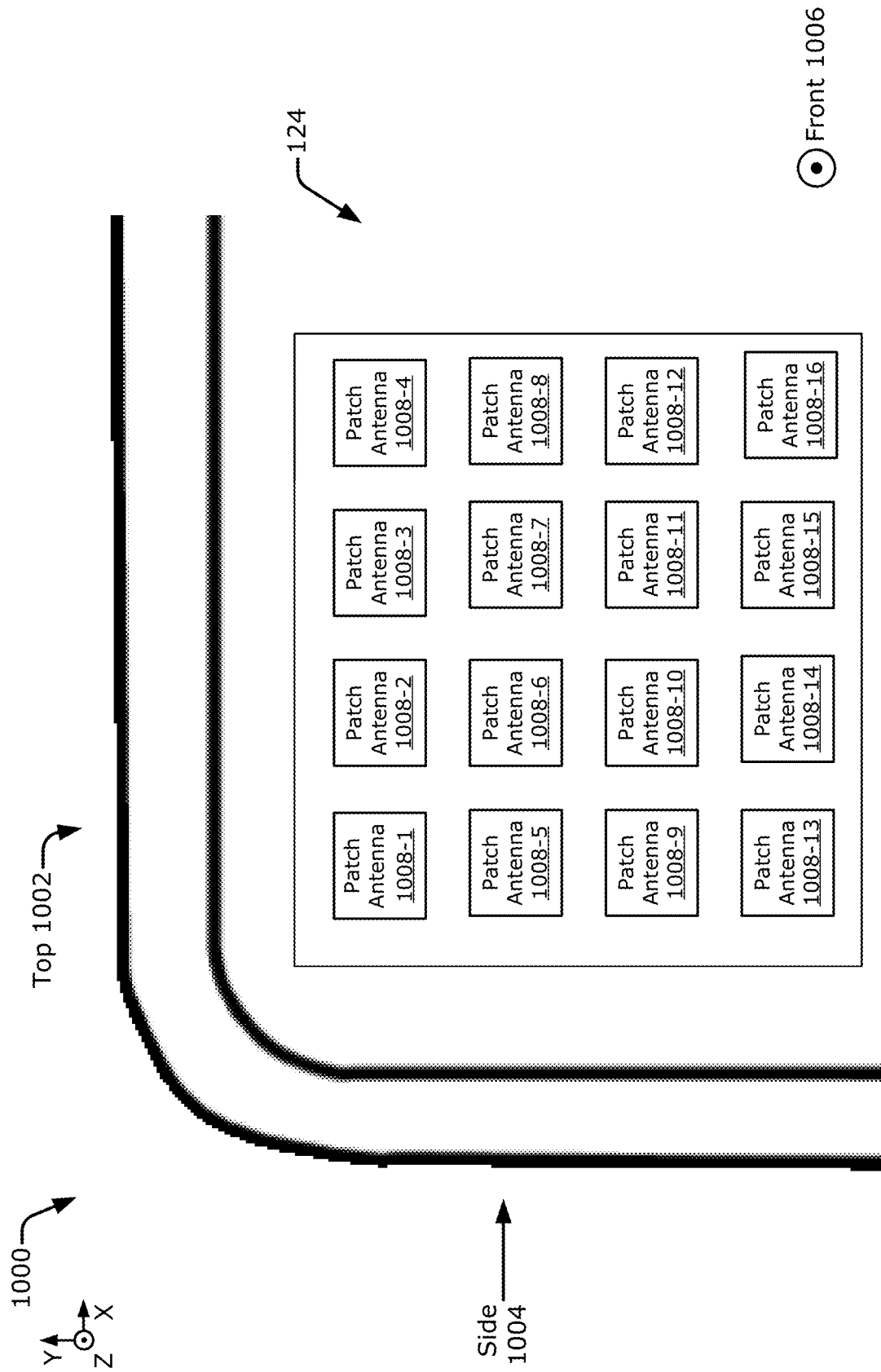
FIG. 10 illustrates an example antenna array for proximity detection based on an coordinated beam scanning.

FIG. 10 illustrates an example antenna array 124 for proximity detection based on coordinated beam scanning. In the depicted configuration, the antenna array 124 is positioned in an upper-left corner of the computing device 1000. The computing device 1000 can include a top 1002 and side 1004. To detect one or more objects 418 (of FIG. 4), the antenna array 206 includes sixteen patch antenna elements 1008-1, 1008-2, 1008-3, 1008-4, 1008-5, 1008-6, 1008-7, 1008-8, 1008-9, 1008-10, 1008-11, 1008-12, 1008-13, 1008-14, 1008-15, and 1008-16. The patch antennas can detect an object 418 that is in front 1006 of the computing device 1000 or above the page along a Z axis.

By having the antennas 124 positioned at different locations within or around the computing device 102, multiple locations of the object 418 can be monitored using the described techniques. This further enables transmission parameters to be independently adjusted relative to which antenna element 1008 detects the object 418. Such independent detection therefore enables two or more of the antenna elements 1008 to be configured for different purposes, for example one of the antenna elements 1008 can be configured for enhanced communication performance while another one of the antenna elements 1008 is simultaneously configured to comply with FCC requirements. The components of the wireless transceiver 120 can be utilized for both wireless communication and proximity detection.

Figure 11:
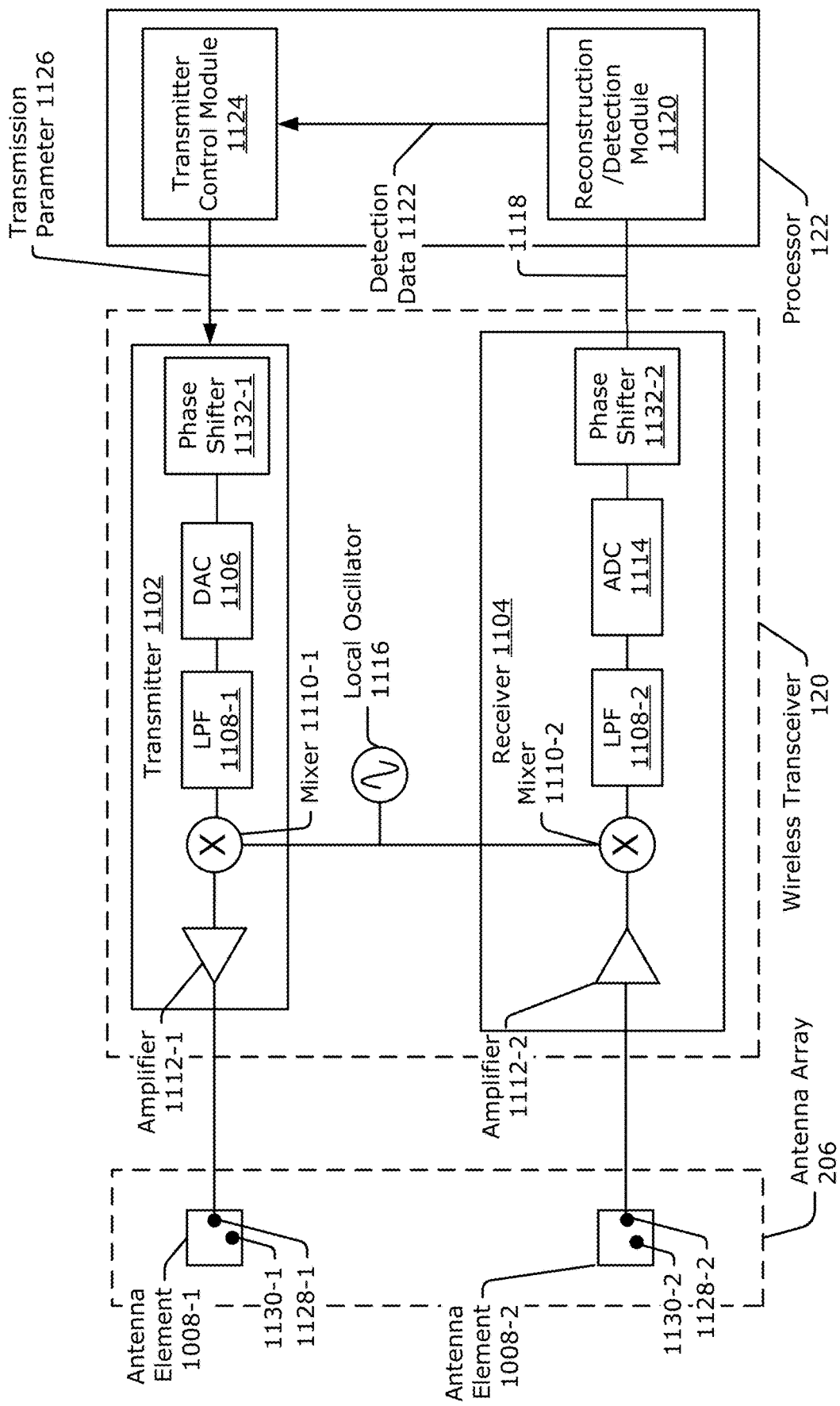
FIG. 11 illustrates an example wireless transceiver and processor for proximity detection based on coordinate beam scanning.

FIG. 11 illustrates an example wireless transceiver 120 and processor 122 for proximity detection based on an electromagnetic field perturbation. The wireless transceiver 120 includes a transmitter 1102 and a receiver 1104, which are respectively coupled between the processor 122 and the antenna array 206. The transmitter 1102 is shown to include a digital-to-analog converter (DAC) 1106, a filter 1108-1 (e.g., a low-pass filter (LPF)), a mixer 1110-1, and an amplifier 1112-1. Although not explicitly shown, the transmitter 1102 can also include a signal generator that is coupled between the digital-to-analog converter 1106 and the processor 122. The signal generator can generate the millimeter wave beam, the proximity detection signal, as shown in FIG. 4.

In the depicted configuration, the transmitter 1102 is coupled to a first feed port 1128-1 of the antenna element 1008-1. The first feed port 1128-1 can comprise, for example, one of the polarized feed ports of the patch antenna. The antenna element 1008-1 can also include a second feed port 1130-2, which is not used in this example.

The receiver 1104 is shown to include a receive chain coupled to another first feed port 1128-2 of the antenna element 1008-2. Although a single antenna element 1008-2 is shown to be coupled to the receive chain, the receive chain can alternatively be respectively coupled to multiple different antenna elements 1008, such as the antenna element 1008-2 and the antenna element 1008-N. The receive chain can include an amplifier 1112-2 (e.g., a low-noise amplifier), mixer 1110-2, filter 1108-2 (e.g., LPFs), and analog-to-digital converter (ADC) 1114-1. The wireless transceiver 120 also includes a local oscillator 1116, which generates a reference signal enabling the mixers 1110-1, and 1110-2 to upconvert or downconvert analog signals within the transmit or receive chains. In some implementations, the local oscillator 1116 can include a frequency-modulated local oscillator to generate a frequency-modulated reference signal that is used to produce a FMCW signal via the mixer 1110-1 and downconvert a received FMCW signal via the mixer 1110-2. The transmitter 1102 and the receiver 1104 can also include other additional components that are not depicted in FIG. 11 such as band-pass filters, additional mixers, switches, and so forth.

Using these components, the transmitter 1102 generates the millimeter wave beam via the antenna elements 1008-1 to 1008-16 using coordinated beam steering techniques. The transmitter 1102 and receiver 1004 both include a phase shifter 1132.

The processor 122 can perform the proximity detection analysis and three-dimensional image reconstruction based on the digital signal 1118-1. In FIG. 11, the processor 122 includes at least one reconstruction/detection module 1120 and at least one transmitter control module 1124. The reconstruction/detection module 1120 obtains the digital signal 1118-1 and generates detection data 1122, which indicates whether or not the object 418 is detected. In some cases, the detection data 1122 can also include a range to the object 418. Based on the detection data 1122, the transmitter control module 1124 generates at least one transmission parameter 1126 that controls one or more transmission attributes for wireless communication. The transmission parameter 1126 can specify one or more transmission-related aspects of the uplink signal 952, such as power level, polarization, frequency, duration, beam shape, beam steering angle, a selected antenna that transmits the uplink signal 952 (e.g., another antenna that is on a different surface of the computing device 102 and is not obstructed by the object 418), combinations thereof, and so forth. By specifying the transmission parameter 1126, the processor 122 can, for example, cause the transmitter 1102 to decrease power if an object 418 is close to the computing device 102 or increase power if the object 418 is at a farther range or is not detectable. The ability to detect the object 418 and control the transmitter 1102 enables the processor 122 to balance the performance of the computing device 102 with compliance. In other implementations, the application processor 108 can perform one or more of these functions.

Although not explicitly shown, multiple antenna elements 208 can be used to form the transmission beam 410 or the receiving beam 412. In this way, additional information is provided to the reconstruction/detection module 1120 to increase a probability of detecting the object 418 (or accurately determining a range thereof) and to decrease a probability of false alarms. The transmitter control module 1124 can also make different adjustments in dependence on whether the object 418 is detected by both antenna elements 1008 or by one of the antenna elements 1008.

In some situations, the object 418 may be closer to one of the antenna elements 1008, which enables one antenna element 1008 to detect the object 418 while another antenna element 1008 may be unable to detect the object 418. In this case, the transmitter control module 1124 can decrease a transmit power of the one antenna element 1008 relative to the other antenna element 1008. In some implementations, the multiple antenna elements 1008 can be used to further characterize the relationship between the object 418 and the antennas 124, such as by estimating an angle to the object 418. In this way, the transmitter control module 1124 can adjust the transmission parameter 1126 to steer the uplink signal 952 away from the object 418.

Figure 12:
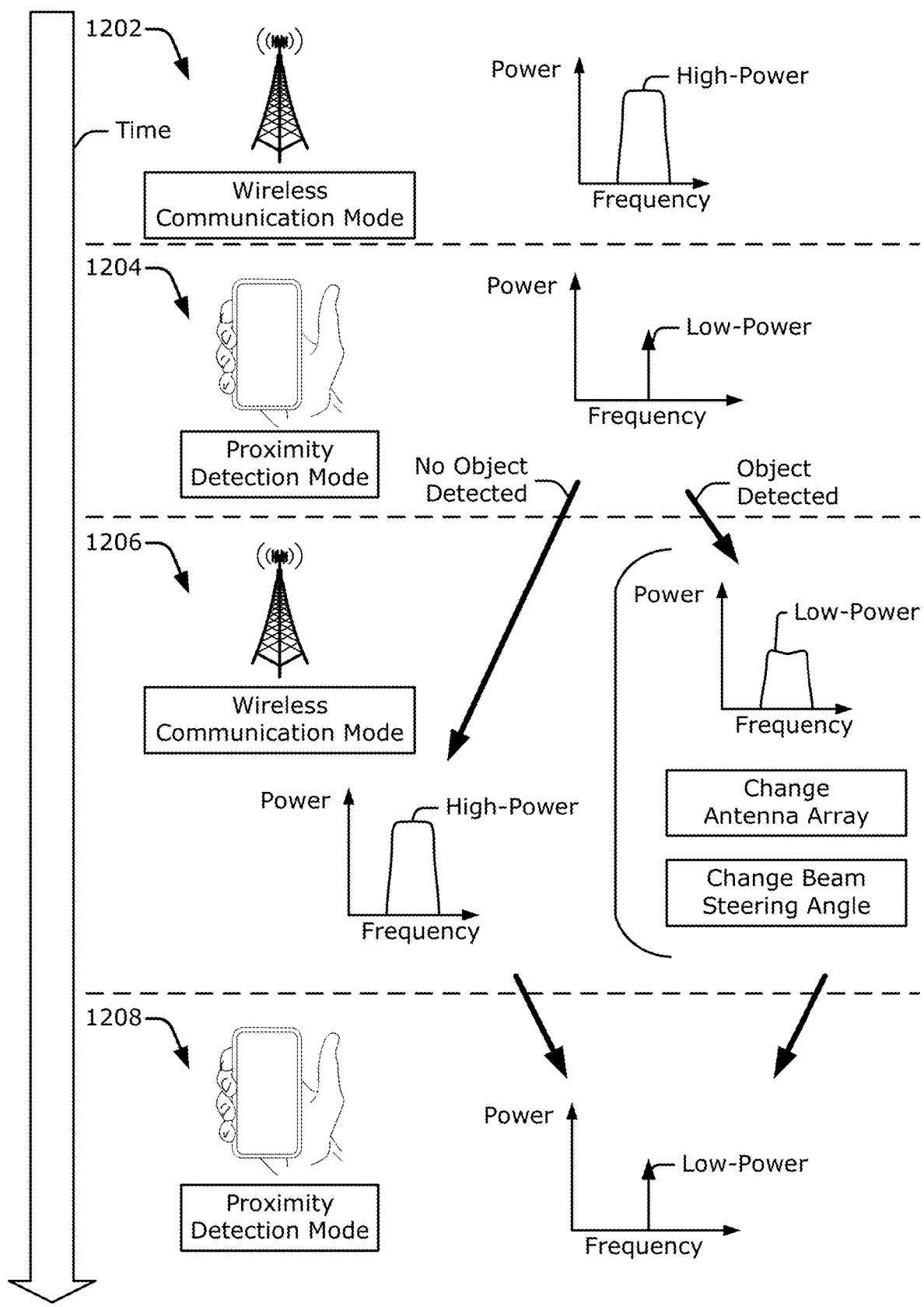
FIG. 12 illustrates an example sequence flow diagram for proximity detection based on coordinated beam scanning techniques

FIG. 12 illustrates an example sequence flow diagram for proximity detection based on coordinated beam scanning techniques. Examples of a wireless communication mode are shown at 1202 and 1206, and examples of a proximity detection mode are shown at 1204 and 1208. At 1202, the wireless transceiver 120 transmits a high-power (e.g., normal) uplink signal 952 configured to provide sufficient range. After transmitting the uplink signal 952, the transmission beam 410 can be generated via the wireless transceiver 120 at 1204. As described above, the transmission beam 410 enables the computing device 102 to detect an object 418 and determine if the object 418 is near the computing device 102. In this case, the transmission beam 410 can be represented by a low-power narrow-band signal. Based on the detection, the transmitter control module 1124 can generate the transmission parameter 1126. In some implementations, the transmission parameter 1126 can be generated for a next uplink signal 952 to account for MPE compliance guidelines. For example, if the object 418 is detected, the transmitter control module 1124 can decrease the transmit power for the next uplink signal 952. Alternatively, if the object 418 is not detected, the transmitter control module 1124 can keep the transmit power unchanged. In other implementations, the transmission parameter 1126 can specify transmission of another transmission beam 410 by specifying another antenna or a different transmit power level of a next transmission beam 410.

The proximity detection mode can also determine the range to the object 418, thereby enabling the transmission parameter 1126 to comply with range-dependent guidelines. An example range-dependent guideline includes a maximum power density. Power density is proportional to transmit power and inversely proportional to range. Accordingly, for a same transmit power level, an object 418 at a closer range is exposed to a higher power density than another object 418 at a farther range. Therefore, a similar power density at the object 418 can be achieved by increasing the transmit power level if the object 418 is at a farther range and decreasing the transmit power level if the object 418 is at a closer range. In this way, the transmission parameter 1126 can be adjusted to enable the power density at the object 418 for both the closer range and the farther range to be below the maximum power density. At the same time, because the range is known, the transmit power level can be increased to a level that facilitates wireless communications and comports with the compliance guideline.

At 1206, the wireless transceiver 120 transmits the next uplink signal 952 using the transmission parameter 1126 generated by the transmitter control module 1124. In the depicted example, a high-power uplink signal 952 is transmitted if an object 418 is not detected. Alternatively, a low-power uplink signal 952 is transmitted if the object 418 is detected. The low-power can be, for example, between approximately five and twenty decibel-milliwatts (dBm) smaller than the high-power signal at 1202. In addition to or instead of changing a power of the next uplink signal 952, the transmission parameter 1126 can specify a different antenna within the computing device 102 or a different beam steering angle for transmitting the next uplink signal 952 (e.g., different than one or more antennas 124 or the beam steering angle used for transmitting the high-power signal at 1202).

At 1208, the wireless transceiver 120 generates another transmission beam 410 to attempt to detect the object 418. By scheduling multiple transmission beams 410 over some time period, the wireless transceiver 120 can dynamically adjust the transmission parameter 1126 based on a changing environment. In some cases, the transmission beam 410 can be generated and sensed between active data cycles that occur during wireless communication or during predetermined times set by the processor 122. By actively monitoring the environment, the wireless transceiver 120 can appropriately adjust the transmission parameter 1126 in real-time to balance communication performance with compliance or radiation requirements. This monitoring also enables the transmission parameter 1126 to be incrementally adjusted to account for movement by the object 418. The sequence described above can also be applied to other antennas. In some cases, the other antennas and the antennas 124 may generate transmission beam 410 at a same time or at different times.

Figure 13:
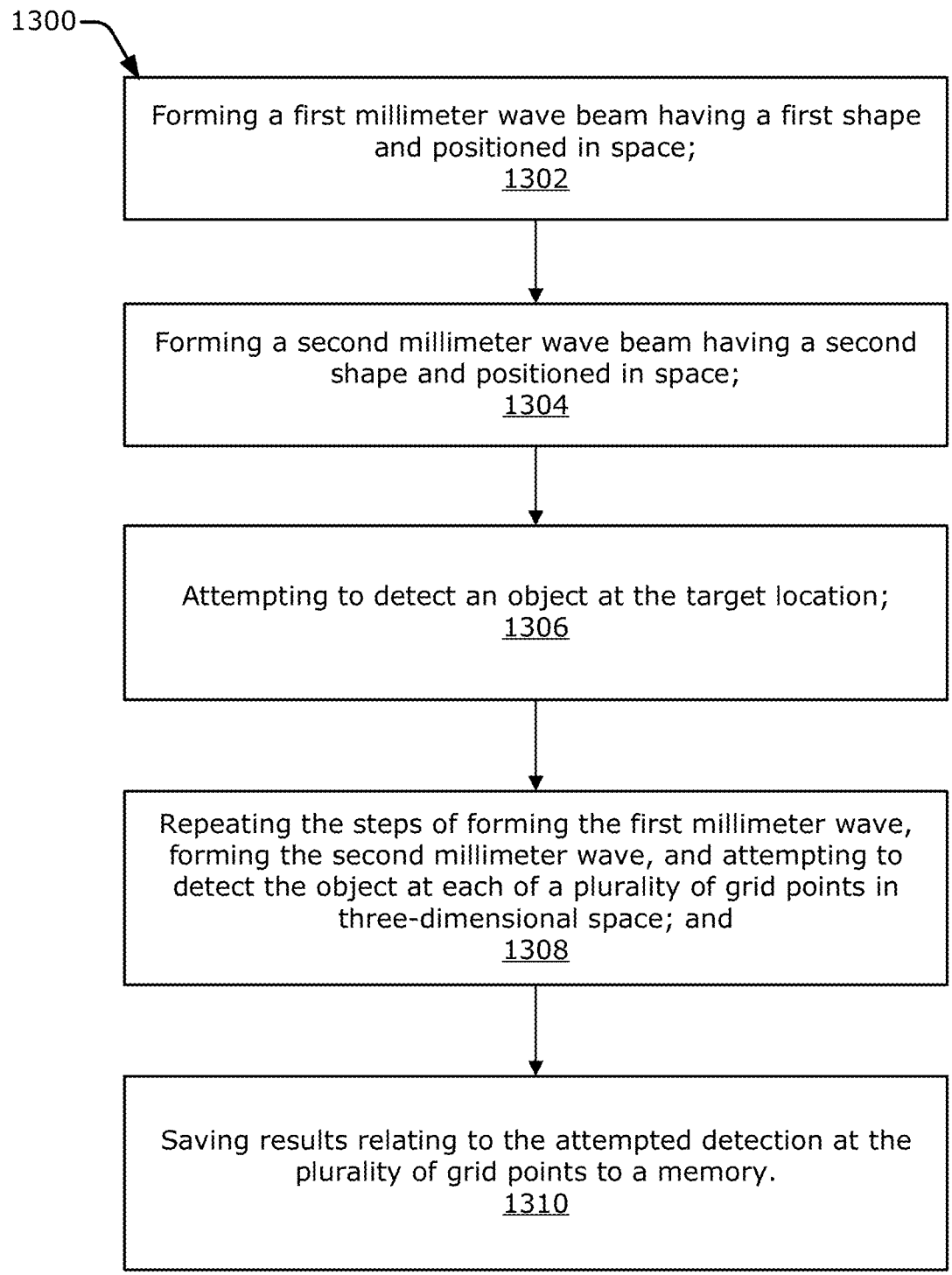
FIG. 13 illustrates a process flow diagram for coordinate beam scanning.

FIG. 13 is a flow diagram illustrating an example process 1300 for proximity detection based on coordinated beam scanning techniques. The process 1300 is described in the form of a set of blocks 1302-1310 that specify operations that can be performed. However, operations are not necessarily limited to the order shown in FIG. 13 or described herein, for the operations may be implemented in alternative orders or in fully or partially overlapping manners. Operations represented by the illustrated blocks of the process 1300 may be performed by a computing device 102 (e.g., of FIG. 1), a controller 622 (e.g., of FIG. 6), or a processor 122 (e.g., of FIG. 1). More specifically, the operations of the process 1300 may be performed by the reconstruction/ detection module 1120 or the transmitter control module 1124.

At 1302, the technique includes forming a first millimeter wave beam having a first shape and positioned in space. The first millimeter wave beam can be formed by transmitting signals from a first antenna array. The first antenna array can include multiple antenna array elements. The first antenna array can be composed of multiple radiating elements each with a phase shifter. Beams can be formed by shifting the phase of the signal emitted from each radiating element, to provide constructive/destructive interference so as to steer the beams in the desired direction. Further the power level can be varied to adjust the range of first millimeter wave. Increasing the power level would increase the range of the first millimeter wave. Decreasing the power level decreases the range of the first millimeter wave. For example, the transmission beam 410 of FIG. 4 can be generated via the wireless transceiver 120 and at least one of the antennas 124. The transmission beam 410 can be generated with a specific frequency, polarization (e.g., horizontal polarization or vertical polarization), phase reference, angular direction (e.g., by performing beamforming techniques using multiple antenna elements 1008 or via a directional antenna), and so forth.

At 1304, the technique can include forming a second millimeter wave beam having a second shape and positioned in space. The second millimeter wave beam can be formed by receiving signals from a second antenna array comprising a second plurality of antenna elements, wherein the first shape of the first millimeter wave beam intersects the second shape of the second millimeter wave beam at a target location in space. The second antenna array can be composed of multiple receiving elements each with a phase shifter. Beams can be formed by shifting the phase of the signal received by each radiating element, to provide constructive/destructive interference so as to steer the beams in the desired direction. Further the gain level can be varied to adjust the range of second millimeter wave. Increasing the gain level would increase the range of the second millimeter wave. Decreasing the gain level decreases the range of the second millimeter wave. Energy from the transmission beam 410 can be detected by the antenna feed port. The antenna feed ports can be associated with a same antenna or with different antennas.

At 1306, the technique attempts to detect an object at the target location in response to detection of reflected signals based on reception associated with the second millimeter wave beam. If the reflected signal is received by the second millimeter wave beam, a detection is indicated. If the reflected signal is not received by the second millimeter wave beam, a missed detection is indicated.

At 1308, the technique includes repeating the steps of forming the first millimeter wave beam, forming the second millimeter wave beam, and attempting to detect the object at each of a plurality of grid points in three-dimensional space. The technique can employ electronic beam steering to change the three-dimensional location scanned. The power and gain levels can be adjusted to vary the range from the computing device.

At 1310, the technique includes saving results to the attempted detection at the plurality of grid points to a memory. In some embodiments, the results can include only detections. In some embodiments, the results can include only missed detections. In some embodiments, the results can include both detections and missed detections.

Figure 14:
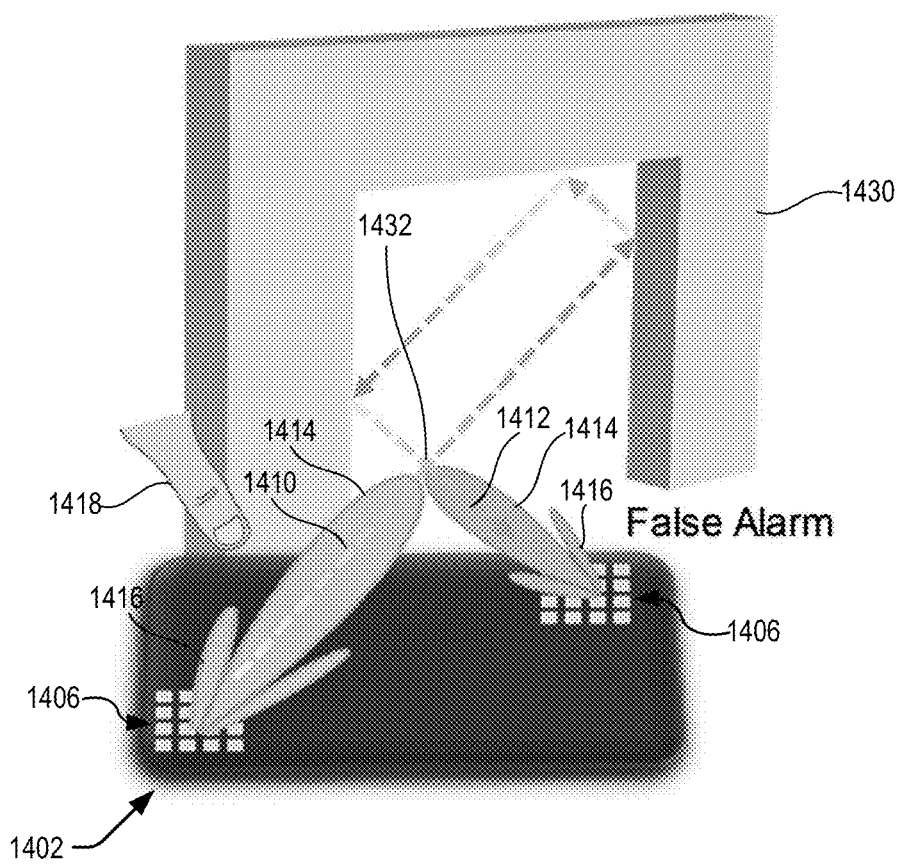
FIG. 14 depicts a technique for reducing false detections for object detection and three-dimensional reconstruction of objects using coordinated beam scanning.

FIG. 14 depicts a technique for reducing false detections for object detection and three-dimensional reconstruction of objects using coordinated beam scanning. Various objects 1430 surrounding the area of the computing device 1402 performing coordinated beam scanning can produce false detections. The energy from the transmission beam 1410 emitting from the antenna array 1406 can be detected by the receiving beam 1412 even in the absence of an object at the target location 1432 if the transmission beam 1410 bounces off various objects 1430. FIG. 14 depicts a transmission beam 1410 with a main lobe 1414 and side lobes 1416 emitted from a first antenna array 1406. The receiving beam 1412 with a main lobe 1414 and a side lobe 1416 can be emitted from a second antenna array 1406. A target 1418 is depicted at a location different from the target location where the transmission beam 1410 and receiving beam 1412 intersect. The receiving beam 1412 can be received by the antenna array 1406 even indicating a false alarm of a detection.

Figure 15:
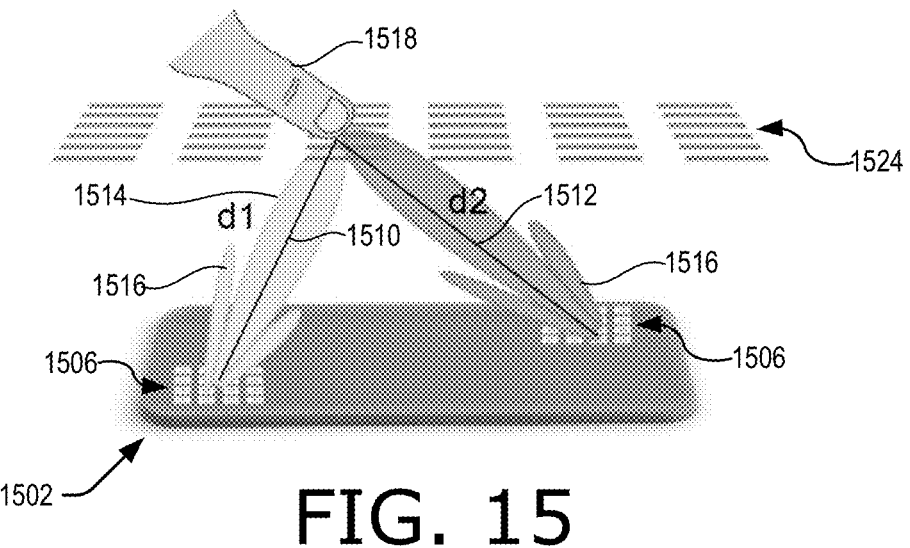
FIG. 15 illustrates a technique for calculating the distances to the target point.

FIG. 15 depicts a technique for reducing false detections for object detection and three-dimensional reconstruction of objects by calculating the distances to the target point. FIG. 15 illustrates a transmission beam 1510 with a main lobe 1514 and side lobes 1516 emitting from an antenna array 1506 of a computing device 1502. FIG. 15 also shows a receiving beam 1512 with main 1514 and side lobes 1516 emitting from an antenna array 1506. FIG. 15 depicts calculating the distance (d1) from the transmission antenna array 1506 to the target 1518 and the distance (d2) from the target point 1518 to the receiver antenna array 1506 for a layer 1524. The total distance (d1+d2) is known by the three-dimensional array controller via antenna pattern characterization. The total distance can be compared to a calculated distance by the radar provided as dRadar=speed of light (c) times the round trip time. In order to eliminate false alarms, the system can be programmed to acknowledge detections when the (known via pattern characterization) total distance d1+d2 is within a threshold amount of the distance found by the radar.

Figure 16:
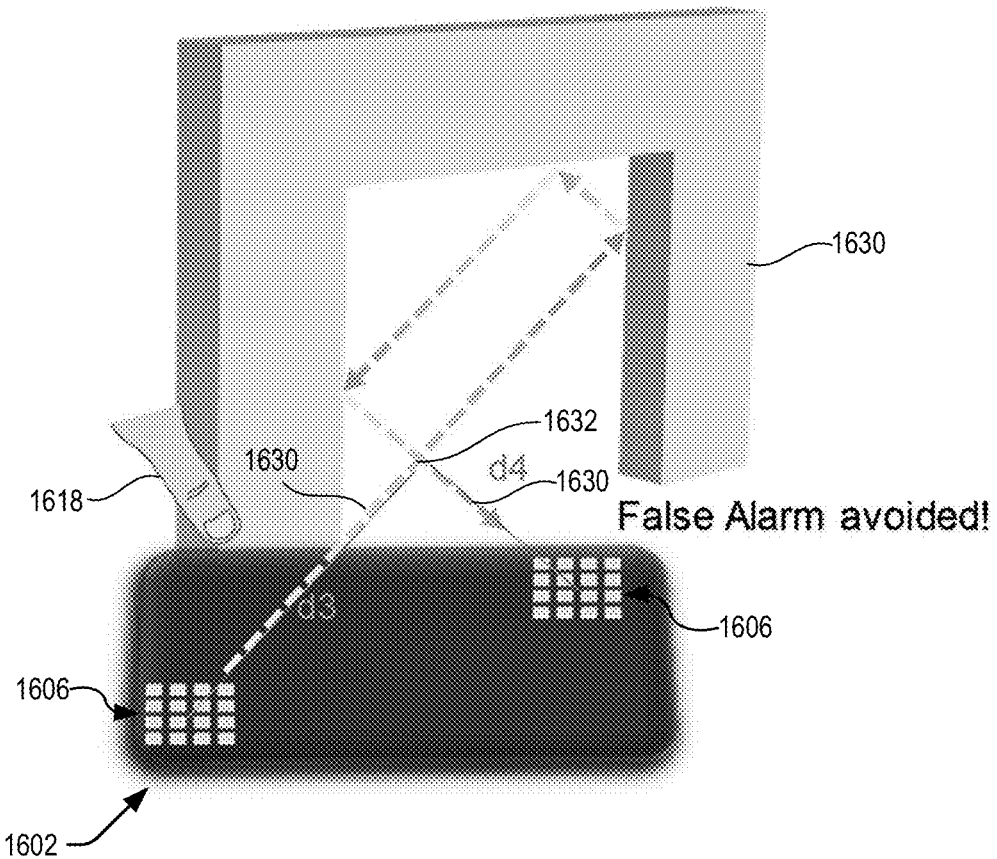
FIG. 16 illustrates application of false detection techniques for coordinated beam scanning in an environment with obstacles.

FIG. 16 applies these techniques to the environment with obstacles shown in FIG. 14. Various objects 1630 surrounding the area of the computing device 1602 performing coordinated beam scanning can produce false detections. The energy from the transmission beam 1610 can be detected by the reception beam 1612 even in the absence of an object at the target location 1632 if the transmission beam 1610 bounces off various objects 1630. FIG. 16 depicts a transmission beam 1610 with a main lobe 1614 and side lobes 1616 emitted from a first antenna array 1606. The reception beam 1612 with a main lobe 1614 and a side lobe 1616 can be emitted from a second antenna array 1606. A target 1618 is depicted at a location different from the target location where the transmission beam 1610 and reception beam 1612 intersect. However, applying the known techniques apply the known distance (d3) from the transmission array 1606 to the target location 1632 plus the distance (d4) from the target area 1632 to the receiving array 1606. When the total distance (d3+d4) does not match the calculated range from the radar, the system would eliminate the detection as a false alarm.

Figure 17:
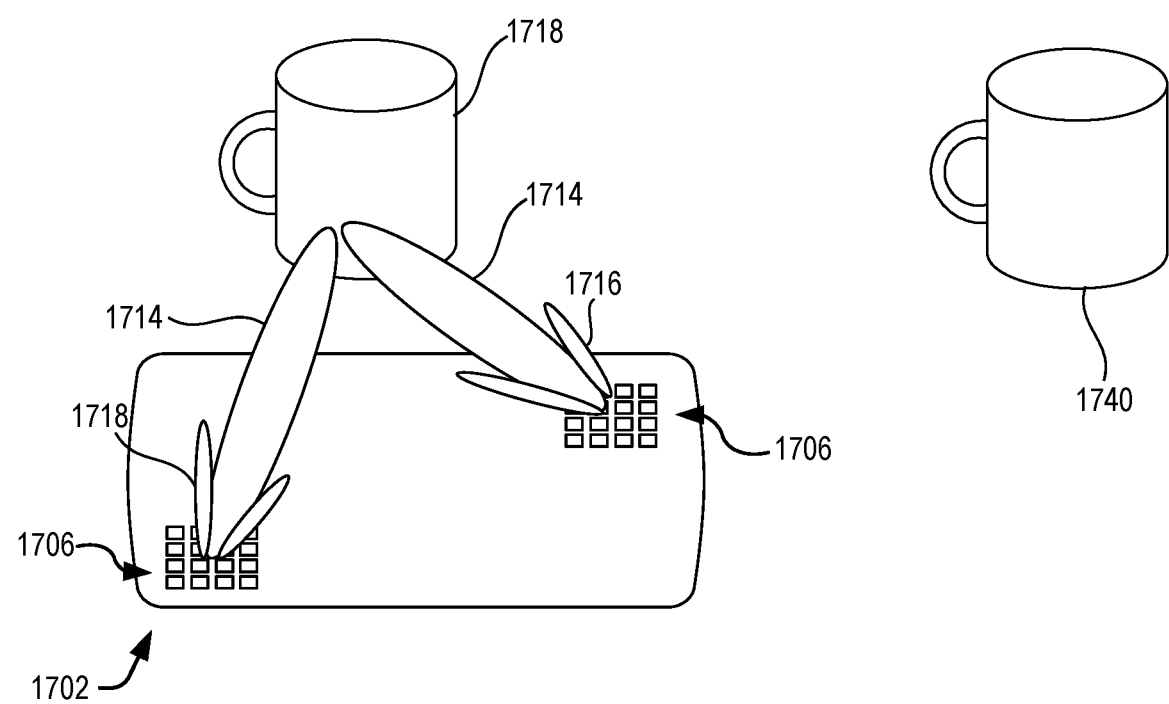
FIG. 17 illustrates an example of three-dimensional reconstruction using coordinated beam forming techniques.

FIG. 17 illustrates an example of three-dimensional reconstruction using coordinated beam forming techniques. FIG. 17 depicts a transmission beam 1710 with a main lobe 1714 and side lobes 1716 emitted from a first antenna array 1706 of a computing device 1702. The receiving beam 1712 with a main lobe 1714 and a side lobe 1716 can be emitted from a second antenna array 1706. An object 1718, here a coffee mug, is depicted in the target location. The techniques allow for scanning the shape of the object using coordinate beam forming. Detections of the target 1718 can be saved to a memory of the computing device. The transmission beam 1710 and the receiving beam 1712 can be electronically steered to cover the surface of the object 1718. Multiple layers, occurring at varying ranges, can be used for a three-dimensional recreation. Using the techniques described above a three-dimensional rendition 1740 is shown.

Figure 18:
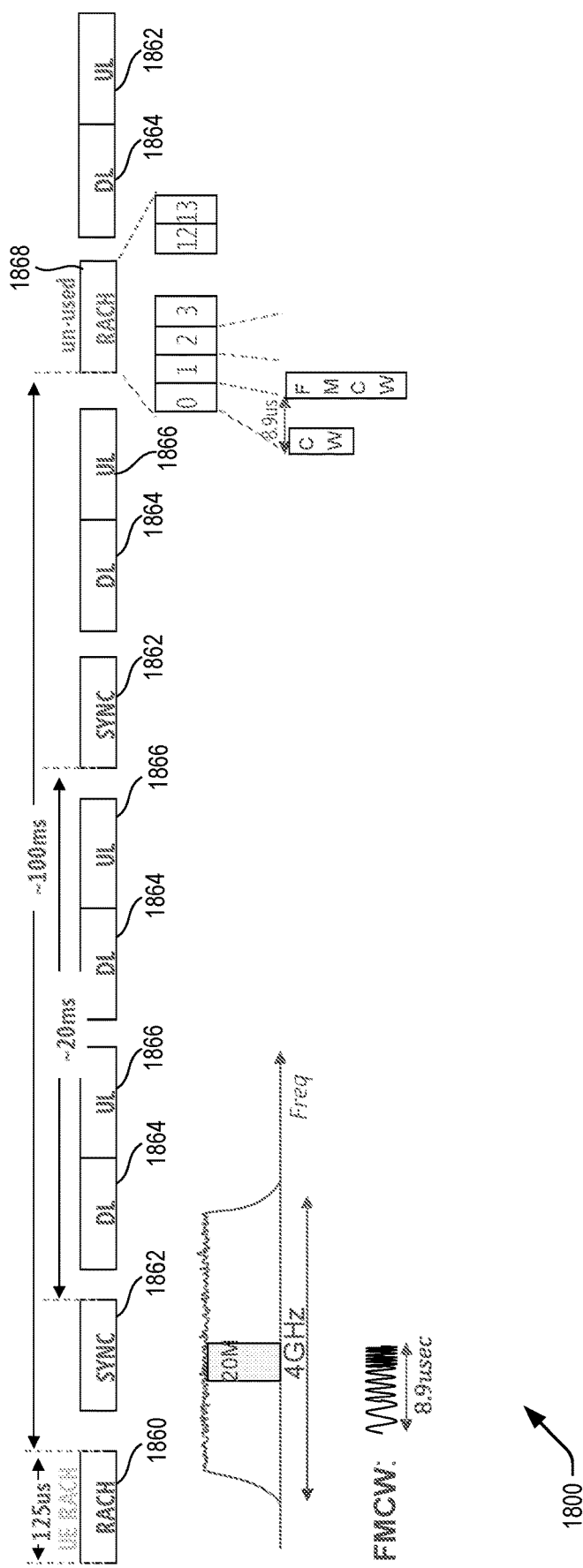
FIG. 18 illustrates an example time domain frequency modulated signal message format that can be used for a fifth generation communications network.

FIG. 18 illustrates an example time domain frequency modulated signal message format 1800 that can be used for a 5G communications network. In various embodiments, the first antenna array and the second antenna array can perform transmission and reception for data communication. The transmission and reception of cellular data be performed on a fifth generation (5G) cellular network. Data communication can be cellular data or other types of data such as WiFi data. The technique can utilize orthogonal frequency-division multiplexing (OFDM) to carry information between the receiver and a transmitter in the network. The first message from the transmitter (UE) to the receiver (eNB) is the Random Access Channel Message (RACH) 1860. The RACH message 1860 is used to establish the timing synchronization between the receiver and transmitter. The RACH message is followed by a synchronization message (SYNC) 1862, and a series of downlink (DL) 1864 data packages, uplink (UL) 1866 data packages. After the main signal there is a second un-used RACH 1868. The un-used RACH 1868 of the transmitter can transmit the radar signal for detections for object detection and three-dimensional reconstruction of objects. The un-used RACH 1868 can be 125 micro seconds in duration to transmit the receiver beam to detect objects. After using the un-used RACH 1868 slot, the transmitter can revert back to normal traffic operation. In some embodiments, only a portion of the un-used RACH symbols can be used to transmit the RADAR signal. The rest of the symbols can be used to tune the radio frequency phase locked loop (PLL) to transmit the chirp signal and revert back the changes.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of coordinated beam scanning, comprising:
   forming a first millimeter wave beam having a first shape and positioned in space, by transmitting signals from a first antenna array comprising a plurality of antenna elements;
   forming a second millimeter wave beam having a second shape and positioned in space, by receiving signals from a second antenna array comprising a second plurality of antenna elements, wherein the first shape of the first millimeter wave beam intersects the second shape of the second millimeter wave beam at a target location in space;
   in response to detection of reflected signals based on reception associated with the second millimeter wave beam, attempting to detect an object at the target location;
   repeating the steps of forming the first millimeter wave beam, forming the second millimeter wave beam, and attempting to detect the object at each of a plurality of grid points in three-dimensional space; and
   saving results relating to the attempted detection at the plurality of grid points to a memory.

2. The method of claim 1, wherein the results relating to the attempted detection include the plurality of grid points for detections of the object.

3. The method of claim 1, wherein the steps of forming the first millimeter wave beam, forming the second millimeter wave beam, and attempting to detecting the object at each of a plurality of grid points in three-dimensional space are performed during an unused transmission period.

4. The method of claim 3, wherein the unused transmission period comprises an unused random-access channel period.

5. The method of claim 1, wherein the forming the first millimeter wave beam is accomplished by adjusting a transmission power level and a phase difference of the first antenna array.

6. The method of claim 1, wherein the forming the second millimeter wave beam is accomplished by adjusting a gain level and a phase difference of the second antenna array.

7. The method of claim 1, further comprising generating an image of the object using the plurality of grid points for which the object is detected and saved to the memory.

8. The method of claim 1, further comprising saving the plurality of grid points for missed detection of the object to the memory.

9. The method of claim 8, further comprising generating an image of the object using a plurality of grid points for missed detection of the object saved in the memory.

10. The method of claim 1, wherein the first antenna array comprising a four-by-four antenna element matrix.

11. The method of claim 1, wherein the second antenna array comprises a four-by-four antenna element matrix.

12. The method of claim 1, wherein the first antenna array and the second antenna array perform transmission and reception for data communication.

13. The method of claim 12, wherein the transmission and reception of data are performed on a fifth generation (5G) cellular network.

14. The method of claim 1, wherein the object is at least a part of a human body, and the plurality of grid points for which the object is detected are used for calculating a distance for comparison to a maximum permissible exposure level.

15. The method of claim 1, wherein the first millimeter wave beam is formed by orthogonal frequency-division multiplexing.

16. The method of claim 1, wherein the first millimeter wave beam is formed by continuous wave transmission.

17. The method of claim 1, wherein the first millimeter wave beam is formed by frequency modulated continuous wave transmission.

18. The method of claim 1, wherein the first millimeter wave beam is formed by direct sequence spread spectrum transmission.

19. The method of claim 1, further comprising:
   calculating an elevation angle and an azimuth angle for the first millimeter wave beam and the second millimeter wave beam, wherein the elevation angle and azimuth angle for the first millimeter wave beam and the second millimeter wave beam can determine a range to the target location;
   calculating a time delay between transmission of the first millimeter wave beam and reception of the second millimeter wave beam to calculate a distance;
   comparing the calculated distance with the determined range to identify one or more false detections of the object; and
   removing false detections if the calculated distance differs by a threshold amount from the determined range.

20. An electronic device for coordinated beam scanning, comprising:
   a first antenna array affixed to a first side of an electronic device, the first antenna array comprising a plurality of antenna elements configured for forming a first millimeter wave beam focused on a target location in space;
   a second antenna array affixed to the first side of the electronic device comprising a second plurality of antenna elements to form a second millimeter wave beam from the target location simultaneous with the first millimeter wave beam focused at the target location;

one or more processors configured for operations comprising:
forming the first millimeter wave beam having a first shape and positioned in space, by transmitting signals from the first antenna array;
forming the second millimeter wave beam having a second shape and positioned in space, by receiving signals from a second antenna array, wherein the first shape of the first millimeter wave beam intersects the second shape of the second millimeter wave beam at the target location in space;
in response to detection of reflected signals based on reception associated with the second millimeter wave beam, attempting to detect an object at the target location;
repeating the steps of forming the first millimeter wave beam, forming the second millimeter wave beam, and attempting to detect the object at each of a plurality of grid points in three-dimensional space; and
saving results relating to the attempted detection at the plurality of grid points to a memory.

21. The electronic device of claim 20, wherein the first antenna array comprising a four by four antenna element matrix.

22. The electronic device of claim 20, wherein the second antenna array comprises a four by four antenna element matrix.

23. The electronic device of claim 20, wherein the first antenna array and the second antenna array perform transmission and reception for data communication.

24. The electronic device of claim 23, wherein the transmission and reception of data are performed on a fifth generation (5G) cellular network.

25. A non-transitory computer-readable storage medium storing computer-executable instructions that, when executed by a processor, configure the processor to perform operations comprising:
forming a first millimeter wave beam having a first shape and positioned in space, by transmitting signals from a first antenna array comprising a plurality of antenna elements;
forming a second millimeter wave beam having a second shape and positioned in space, by receiving signals from a second antenna array comprising a second plurality of antenna elements, wherein the first shape of the first millimeter wave beam intersects the second shape of the second millimeter wave beam at a target location in space;
in response to detection of reflected signals based on reception associated with the second millimeter wave beam, attempting to detect an object at the target location;
repeating the steps of forming the first millimeter wave beam, forming the second millimeter wave beam, and attempting to detect the object at each of a plurality of grid points in three-dimensional space; and
saving results relating to the attempted detection at the plurality of grid points to a memory.

26. A means for three dimensional reconstruction of an object, comprising:
a first antenna array affixed to a first side of an electronic device for forming a first millimeter wave beam having a first shape and positioned in space, by transmitting signals from the first antenna array comprising a first plurality of antenna elements;
a second antenna array affixed to the first side of the electronic device for forming a second millimeter wave beam having a second shape and positioned in space, by receiving signals from a second antenna array comprising a second plurality of antenna elements, wherein the first shape of the first millimeter wave beam intersects the second shape of the second millimeter wave beam at a target location in space;
one or more processors configured for:
in response to detection of reflected signals based on reception associated with the second millimeter wave beam, attempting to detect an object at the target location;
repeating the steps of forming the first millimeter wave beam, forming the second millimeter wave beam, and attempting to detect the object at each of a plurality of grid points in three-dimensional space; and
saving results relating to the attempted detection at the plurality of grid points to a memory.

27. The means for three dimensional reconstruction of an object of claim 26, wherein the forming the first millimeter wave beam is accomplished by adjusting a transmission power level and a phase difference of the first antenna array.

28. The means for three dimensional reconstruction of an object of claim 26, wherein the forming the second millimeter wave beam is accomplished by adjusting a gain level and a phase difference of the second antenna array.

29. The means for three dimensional reconstruction of an object of claim 26, wherein the results relating to the attempted detection include the plurality of grid points for detections of the object.

30. The means for three dimensional reconstruction of an object of claim 26, wherein the steps of forming the first millimeter wave beam, forming the second millimeter wave beam, and attempting to detecting the object at each of a plurality of grid points in three-dimensional space are performed during unused transmission opportunities.

* * * * *